United States Patent Office 3,441,502
Patented Apr. 29, 1969

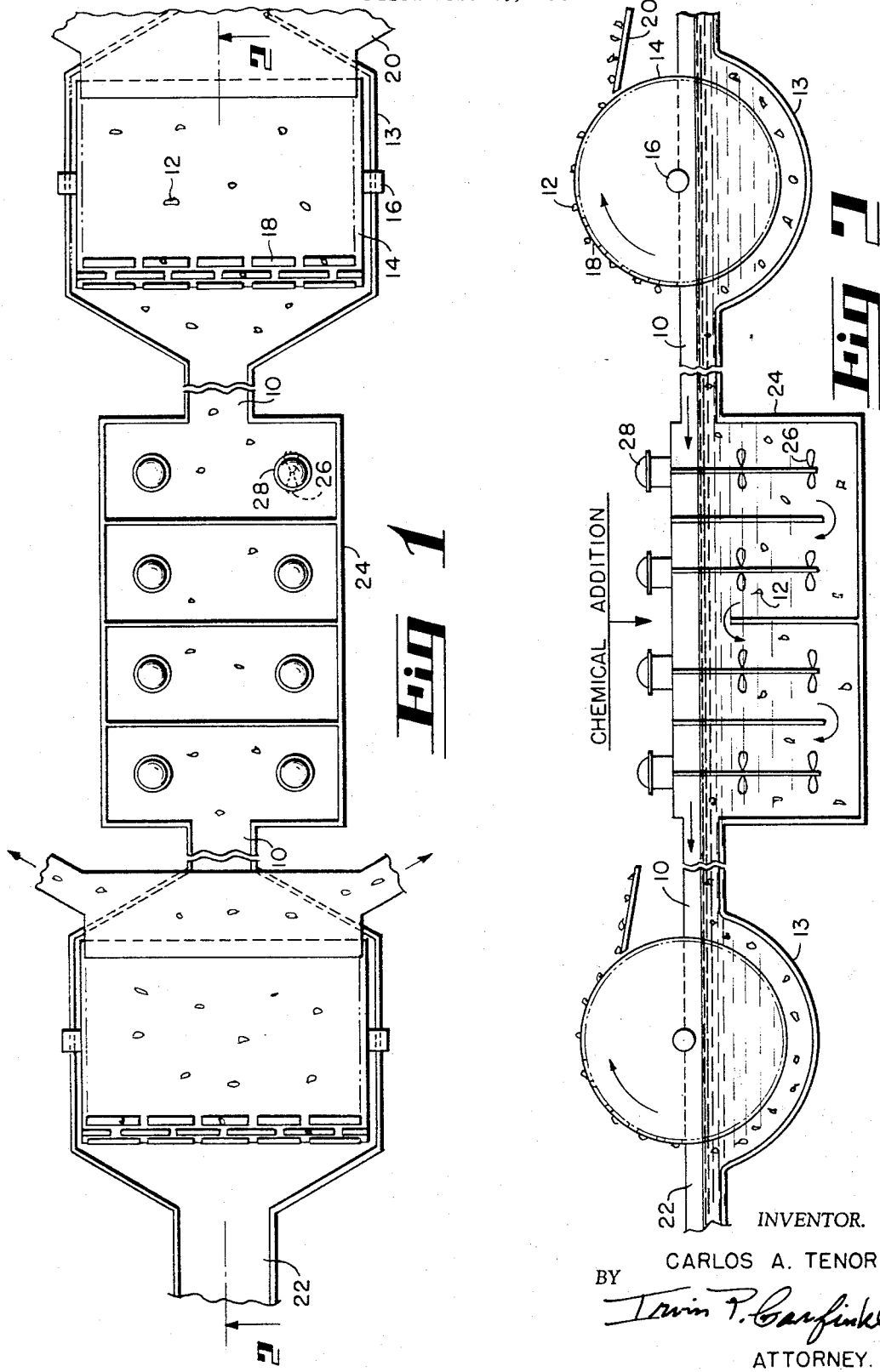

3,441,502
METHOD AND APPARATUS FOR THE REMOVAL AND DISPOSAL OF SCALE
Carlos A. Tenorio, 3009 Catherine Drive,
South Fort Mitchell, Ky. 41017
Filed Feb. 20, 1967, Ser. No. 617,176
Int. Cl. C02b *1/20;* B01d *35/06*
U.S. Cl. 210—49                4 Claims

ABSTRACT OF THE DISCLOSURE

Scale developed from steel mill operations is removed from water by first removing the coarser particles with magnets, then producing a floc to suspend the residual finer particles in a sludge which is subsequently removed by magnets, leaving clarified water suitable for recirculation.

---

This invention relates to a system for the removal of scale and the disposition thereof in steel mill operations.

In steel mill operations it is necessary to heat the steel to very high working temperatures, and such heating, usually in the presence of air, results in the formation of a scale consisting principally of iron oxide on the steel surfaces. This scale must be removed and subsequently disposed of.

In accordance with prior art teaching, scale may be removed by mechanical scraping or high pressure jets of water, the loose scale is then flushed by water into channels or flumes. The result of such operations is the accumulation of large quantities of water in which the scale is suspended. The scale must then be separated from the water to make the water suitable for reuse or disposal. Present practice is to divert the water with suspended scale into large settlement pits or ponds where the scale is permitted to settle by gravity. This technique requires a period of time, in the order of days, for the smaller particles to settle to the bottom of the pits, and consequently the size and expense of these pits becomes prohibitive.

The primary object of this invention is to provide a novel method which reduces the cost and expense of scale removal.

The novel method of this invention involves three general steps. First, since the particles of scale do not lose their magnetic properties, magnets are used to separate the larger particles from the water. To this end, the water with suspended particles is directed into a shallow basin and then into contact with a rotating magnetized large drum. The larger particles of scale adhering to the drum are rotated out of the water stream and then removed by scapers or other conventional means. While the velocity of the water stream, its flow, and depth, as well as the velocity of the rotating drum can be varied to control the amount of pick-up of scale, there will nevertheless be a residual of extremely fine scale which cannot be separated from the water by any known mechanical means.

The second step involves a chemical operation to produce a floc that will entrap the residual scale and then settle down rapidly. If the water is treated with a mixture, for example, of ferric sulfate and lime (in suitable proportions depending on the hardness and chemical composition of the aqueous medium in which the scale is suspended), the resulting sludge within which the scale is entrapped exhibits a magnetism, due to the presence of the scale.

In the third and final step, the magnetic sludge is removed by a magnetic drum, whereby a clarified water, suitable for recirculation or for discharge into rivers or lakes without further treatment, is produced.

It is an object of this invention to separate fine ferrous particles including scale, iron oxides and the like commonly found in the processing of iron and steel and most frequently in operations such as rolling, forging, grinding, polishing, and other operations involving hot- or cold-working, cutting or reshaping of steel.

Another object of this invention is to remove scale or other fine ferrous particles from suspension in fluid, such as water, by the steps of: (1) magnetic separation to remove the heavier particles; (2) flocculation to entrap the fine residual particles to cause rapid separation thereof; and (3) magnetic separation to remove the floc entrapped particles.

It is another object of this invention to remove or separate fine ferrous particles, such as those found in the processing of iron and steel, from suspension in water by two stages of magnetic separation, the first stage removing the heavier particles and the second stage of magnetic separation following a treatment of the particles to render them more amenable to the separation.

For further objects and advantages of this invention, reference should now be made to the following detailed specification and to the accompanying drawings in which:

FIGURE 1 is a plan view of a schematic representation of the apparatus used in accordance with this invention; and FIGURE 2 is a section taken through the line 2—2 in FIGURE 1.

Referring to the drawings, there is shown a trough 10 carrying magnetic ferrous particles 12 in suspension in water, the particles having been removed in the form of scale from the surface of a magnetic material, such as steel, during processing operations such as rolling, grinding, and polishing. The trough 10 is provided with an enlarged semicyclindrical shaped portion 13 in which a cylindrical drum 14 is mounted for rotation on a horizontal shaft 16. A plurality of magnets 18 spaced around the entire surface of the cylindrical drum 14 functions to attract at least a portion of the magnetic particles 12 to the drum as the drum rotates through the particles in the flowing liquid. As the drum rotates the heavier particles are attracted to the surface of the drum and then rotated out of the fluid and into the path of an appropriately positioned scraper 20, from which the particles may be led to a storage area (not shown).

It will be observed that the width of the trough 10 at the semicylindrical shaped portion 13 is considerably enlarged as compared with the width at the entrance portion of the trough. This means that the same volume of fluid flowing through the entrance portion of the trough 10 can be accommodated in much shallower depth in the portion 13 and that the fluid flow through the enlarged area will be at a much slower rate. In this way the particles are forced to flow slowly and in close proximity to the magnets. Since the attractive force between the particles and the magnets is in inverse proportion to the square of the distance, this proximity results in a substantial improvement in efficiency.

In addition, the drum is rotated, as indicated by the arrows, so that the portion of the drum contacting the fluid is moving in the same direction as the fluid. This also serves to increase the contact time.

As the fluid reaches the exit portion 22 of the trough, it carries in suspension only the finer particles. Since the coarser particles have been removed, more efficient operation of the second stage of the process is permitted.

In the second stage of the process, the fluid with the finer suspended particles is carried through the exit portion 22 of the trough into a basin 24. There the fluid is mixed with chemicals (hereinafter to be described) required to achieve flocculation. While some chemical reaction does take place, it is important to note that no change in the chemical structure of the suspended particles occurs. This is essential since a chemical change in the particles could result in the loss of the magnetic properties required by the third stage of the process. The basin is provided with a plurality of baffles, tending to cause turbulent flow of the fluid, as well as a plurality of impellers 26 driven by motors 28.

The material useful in the flocculation process can be any, for example, of the following: Ferric sulfate, ferrous sulfate, alum, ferric chloride, or any of the many flocculants commercially available, provided, however, that they do not alter the magnetic properties of the particles. Lime or soda ash is also used in order to correct the pH to the level required for the most efficient flocculation. The pH varies with the chemicals used and with many other factors such as temperature, other impurities present, reaction time available, economical considerations, etc.

As an example, if ferric sulfate and lime are used, the following quantities were found to provide satisfactory results for most industrial waters containing suspended scale: 260 pounds of ferric sulfate and 340 pounds of lime per million gallons of water. These chemicals are mixed by the mechanical impellers or agitators 26 driven by the motors 28 in combination with the baffles. It is to be understood that any equivalent device that will evenly disperse the chemicals within the fluid may also be used. Once the chemicals have achieved the proper flocculating action, the fluid is discharged into a second magnetic separator which, for all practical purposes, is substantially identical to the first magnetic separator described above. In the second separator, the fine particles, now entrapped in the floc, are removed. The fluid leaving the second magnetic separator is completely pure since not only the magnetic substances are removed, but all the chemicals are also removed from it in the form of floc. After removal from the fluid, the combination of floc and impurities is called "sludge." As before, the sludge is removed by a scraper from the magnets and disposed of in any convenient manner. As explained before, the sludge is magnetic, which is what makes possible its separation from the fluid by magnets.

It will be apparent to persons skilled in the art that many modifications and adaptations are available. For example, the configuration of the drum and the location of the scrapers may be varied without departing from the spirit of the invention, and also other means for flocculating the fluid may be used. It is intended, therefore, that the invention be limited only by the appended claims as read in the light of the prior art.

What is claimed is:

1. A method for the removal of coarser and finer magnetic particles form a liquid in which a flocculation process can be performed, comprising the steps:
   (1) passing said fluid over a magnetic drum to remove the coarser particles by magnetic separation;
   (2) subsequently flocculating the fluid by addition of a flocculant material which does not alter the magnetic properties of the particles, said finer particles of suspended magnetic material being entrapped by the resulting floc; and
   (3) passing said floc with the entrapped finer particles over a magnetic drum to remove said floc and said finer particles in the form of sludge from said fluid.

2. The invention as defined in claim 1 wherein said fluid is water and wherein said step of flocculating the fluid is accomplished chemically and mechanically.

3. The invention as defined in claim 2 wherein said step of flocculating the fluid chemically and mechanically includes the mixing of a chemical flocculant with the fluid and agitating said mixture until said floc is produced.

4. The invention as defined in claim 3, and the step of removing sludge from the magnetic drum.

References Cited

UNITED STATES PATENTS

| | | | |
|---|---|---|---|
| 2,400,461 | 5/1946 | Hills | 210—42 X |
| 2,564,593 | 8/1951 | Caldwell | 210—222 |
| 2,768,746 | 10/1956 | Colburn | 210—42 |
| 3,257,081 | 6/1966 | Brown et al. | 210—42 X |

SAMIH N. ZAHARNA, *Primary Examiner.*

J. ADEE, *Assistant Examiner.*

U.S. Cl. X.R.

210—73, 222